Patented Mar. 5, 1929.

1,703,915

UNITED STATES PATENT OFFICE.

ARTHUR ZITSCHER, OF OFFENBACH-ON-THE-MAIN, GERMANY, ASSIGNOR TO GRASSELLI DYESTUFF CORPORATION, OF NEW YORK, N. Y., A CORPORATION OF DELAWARE.

PROCESS FOR MANUFACTURING ORTHO-AMINODIARYLETHERS.

No Drawing. Application filed December 16, 1927, Serial No. 240,631, and in Germany December 24, 1926.

I have found a new, very useful and almost generally applicable method of manufacturing ortho-aminodiarylethers. My process consists in acting with an alkali metal salt of hydroxycompounds of the aromatic series on ortho-dinitrocompounds of the benzene series and in treating the ortho-nitrodiarylethers thus obtained with reducing agents.

The components of reaction may be mixed either directly together or with addition of a suitable solvent or diluent.

The ortho-aminodiarylethers of the general formula:

wherein R means an arylresidue of the benzene naphthalene or anthracene series and the benzene nucleus may contain further substituents, are obtained by my process in a good yield and in a very pure state. They are valuable intermediates for the production of dyestuffs.

The course of reaction is surprising in view of the well known inactivity of the aromatic hydroxycompounds, particularly of the negatively substituted ones. My process produces, when using nuclear substituted components besides ortho-aminodiphenylether itself its substitution products partly unknown hitherto.

In order to further illustrate my invention the following examples are given, the parts being by weight and all temperatures in centigrade degrees. But I wish to be understood that I am not limited to the particular conditions nor to the specific products mentioned therein.

Example 1.

A mixture of 168 parts of ortho-dinitrobenzene and of 170 parts of phenolate of potassium is warmed for about an hour on the water-bath. In this manner the ortho-nitrodiphenylether of the formula:

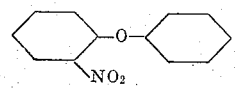

is obtained as a clear yellow oil, which may be purified by distillation. It boils at 195–197° at 45 mm. pressure as described in literature (cf. American Chem. Soc., vol. 38, page 1534).

When reduced in the usual manner it yields the ortho-aminodiphenylether of the formula:

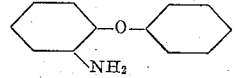

which may be purified by distillation. When recrystallized from ligroine, it melts at 41° (cf. Chem. Soc., vol. 127, page 544).

Example 2.

A mixture of 202,5 parts of 3.4-dinitro-1-chlorobenzene and of 170 parts of phenolate of potassium is warmed for about an hour on the water-bath. In this manner the 5-chloro-2-nitrodiphenylether of the formula:

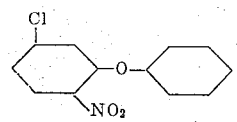

is obtained with a good yield. When recrystallized from spirit it melts at 85° (not corrected).

When carrying out the condensation with addition of spirit by shortly heating the mass under reflux, the yield is almost a theoretical one.

249,5 parts of the formed 5-chloro-2-nitrodiphenylether are introduced in a boiling reducing mixture, consisting of 250 parts of cast-iron borings, 50 parts of glacial acetic acid and 1000 parts of water, and the mass is boiled, until the reaction is finished. The 5-chloro-2-aminodiphenylether of the formula:

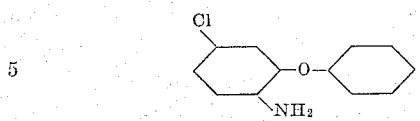

thus formed is isolated in the usual manner. When recrystallized from ligroin it melts at 40–41° (not corrected), as described in the aforesaid literature (cf. Chem. Soc., vol. 127, page 544).

*Example 3.*

A solution of 47 parts of 2.5-dichlorophenolate of soda in spirit is mixed with an alcoholic solution of 81 parts of 3.4-dinitro-1-chlorobenzene and the mixture is heated for some time on the water-bath. In this manner the 5.2′.5′-trichloro-2-nitrodiphenylether of the formula:

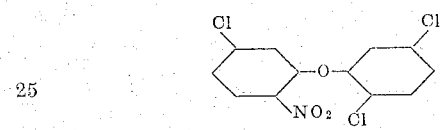

is obtained, melting at 97–98°, when recrystallized from spirit. On reduction it yields the 5.2′.5′-trichloro-2-aminodiphenylether of the formula:

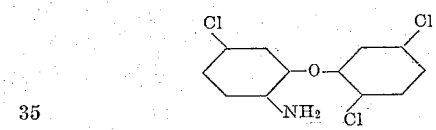

melting at 74–75° (not corrected), when recrystallized from dilute spirit. Both compounds are new products.

In the same manner f. i. 5-chloro-2-nitrophenyl-β-naphthylether of the formula:

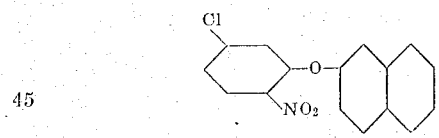

melting at 109–110° (not corrected), when recrystallized from dilute acetone, and 5-chloro-2-aminophenyl-β-naphthylether of the formula:

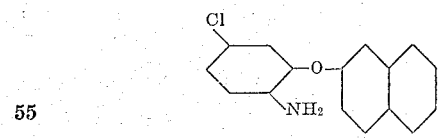

melting at 108–109°, when recrystallized from ligroine, are obtained. As further new products, obtainable according to my process may be named: 5.4′-dichloro-2-nitrodiphenylether of the formula:

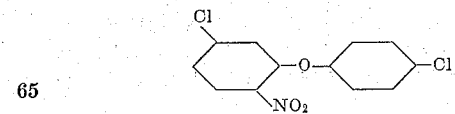

melting point 80–81° (not corrected) from ligroine, and 5.4′-dichloro-2-aminodiphenylether of the formula:

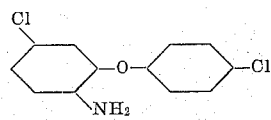

melting point 76–77° from dilute spirit.

With other dinitrocompounds of the benzene series, such as 3.4-dinitrotoluene and with other aromatic hydroxycompounds, such as cresols, dihydroxybenzenes or their mono-alkylethers, or f. i. hydroxyanthracene the process may be carried out in the same manner.

I claim:

1. Process for manufacturing ortho-aminodiarylethers of the general formula:

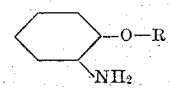

in which formula R means an arylresidue and the benzene nucleus may contain further substituents, which process comprises acting with an alkali metal salt of an hydroxycompound of the aromatic series on ortho-dinitrocompounds of the benzene series and treating the ortho-nitrodiarylethers thus formed with reducing agents.

2. Process for manufacturing ortho-aminodiarylethers of the general formula:

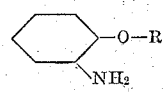

in which formula R means an arylresidue and the benzene nucleus may contain further substituents, which process comprises acting with an alkali metal salt of an hydroxycompound of the aromatic series in presence of a diluent on ortho-dinitrocompounds of the benzene series and treating the ortho-nitrodiarylethers thus formed with reducing agents.

3. Process for manufacturing ortho-aminodiarylethers of the general formula:

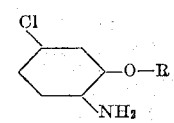

in which formula R means an arylresidue, which process comprises acting with an alkali metal salt of an hydroxycompound of the aromatic series on 3.4-dinitro-1-chlorobenzene and treating the ortho-nitrodiarylethers thus formed with reducing agents.

4. In the process for producing ortho-aminodiarylethers the manufacture of ortho-nitrodiarylethers of the general formula:

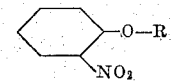

in which formula R means an arylresidue and the benzene nucleus may contain further substituents, which comprises acting with an alkali metal salt of an hydroxycompound of the aromatic series on ortho-dinitrocompounds of the benzene series.

5. Process for manufacturing ortho-aminodiarylethers of the general formula:

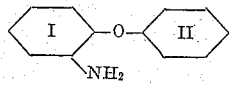

in which formula at least the benzene nucleus signified by II is chlorinated, which process comprises acting with an alkali metal salt of a chlorinated hydroxycompound of the aromatic series on ortho-dinitrocompounds of the benzene series and treating the ortho-nitrodiarylethers thus formed with reducing agents.

6. Process for manufacturing 5.2'.5'-trichloro-2-aminodiphenylether of the formula:

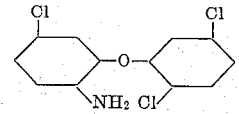

which process comprises acting with an alkali metal salt of 2.5-dichloro-phenol on 3.4-dinitro-1-chlorobenzene and treating the ortho-nitro-diarylether thus formed with reducing agents.

In testimony whereof, I affix my signature.

ARTHUR ZITSCHER.